US012286200B2

(12) United States Patent
Larkin

(10) Patent No.: US 12,286,200 B2
(45) Date of Patent: Apr. 29, 2025

(54) KAYAK AND OTHER WATERCRAFT TYPE STORAGE SYSTEM

(71) Applicant: Donna Larkin, Cohoes, NY (US)

(72) Inventor: Donna Larkin, Cohoes, NY (US)

( * ) Notice: Subject to any disclaimer, the term of this patent is extended or adjusted under 35 U.S.C. 154(b) by 321 days.

(21) Appl. No.: 17/689,626

(22) Filed: Mar. 8, 2022

(65) Prior Publication Data

US 2022/0289350 A1 Sep. 15, 2022

Related U.S. Application Data

(60) Provisional application No. 63/158,490, filed on Mar. 9, 2021.

(51) Int. Cl.

*B63C 15/00* (2006.01)
*A47F 10/00* (2006.01)
*G07C 9/00* (2020.01)

(52) U.S. Cl.

CPC .............. *B63C 15/00* (2013.01); *A47F 10/00* (2013.01); *G07C 9/00182* (2013.01)

(58) Field of Classification Search

CPC ......... A47F 10/00; B60R 9/042; B63C 15/00; G07C 9/00182

USPC ........ 211/4, 60.1, 85.7; 224/310; 280/414.1, 280/414.2, 414.3; 296/157; 414/462

See application file for complete search history.

(56) References Cited

U.S. PATENT DOCUMENTS

| | | | | | |
|---|---|---|---|---|---|
| 3,051,503 | A * | 8/1962 | Halperin | B60F 3/0076 | 180/2.2 |
| 3,404,913 | A * | 10/1968 | Lahey | B60P 3/1041 | 224/520 |
| 3,488,084 | A * | 1/1970 | Ekstrom | B60P 3/341 | 135/904 |
| 3,610,431 | A * | 10/1971 | Rodden | B60P 3/1033 | 211/207 |
| 4,003,485 | A * | 1/1977 | Edgerton | B60P 3/1025 | 224/310 |
| 4,243,242 | A * | 1/1981 | Waits | B60P 3/1033 | 280/414.1 |
| 4,531,879 | A * | 7/1985 | Horowitz | B60R 9/08 | 224/310 |
| 4,690,467 | A * | 9/1987 | Imbert | A47B 81/00 | 232/1 D |
| 4,869,545 | A * | 9/1989 | Notermann | B60P 3/32 | 296/157 |
| 5,096,216 | A * | 3/1992 | McCalla | B60P 3/1033 | 410/24 |
| 5,330,058 | A * | 7/1994 | Rice | A47F 5/01 | 312/265.4 |
| 6,298,802 | B1 * | 10/2001 | Brignolio | B63B 7/02 | 114/61.18 |
| 6,367,866 | B1 * | 4/2002 | Moore | B60P 3/1033 | 114/344 |

(Continued)

*Primary Examiner* — Joshua E Rodden

(57) ABSTRACT

A watercraft storage system for storing and securing one or more watercraft and other equipment used in conjunction with the watercraft. Securing of the watercraft in a storage location of the watercraft storage system, and the other equipment in a compartment associated with the storage location, is achieved, at least in part, by a moveable, e.g., rotational, arm structure associated with the storage location being in a locked position and the size of at least one dimension of the watercraft exceeding the size of a corresponding dimension of the storage location including the moveable arm structure.

18 Claims, 7 Drawing Sheets

(56) References Cited

U.S. PATENT DOCUMENTS

| | | | | |
|---|---|---|---|---|
| 6,390,309 | B1 * | 5/2002 | Tucker | B63B 32/83<br>D6/552 |
| 6,796,263 | B2 * | 9/2004 | Meyer | B63B 17/02<br>296/100.1 |
| 7,070,196 | B1 * | 7/2006 | Larsen | B60P 3/1066<br>211/85.7 |
| 7,677,592 | B2 * | 3/2010 | Giesler | B62D 63/062<br>280/789 |
| 7,780,050 | B2 * | 8/2010 | Tucker | B60R 9/042<br>224/310 |
| 9,669,907 | B2 * | 6/2017 | Field | B63B 32/83 |
| 10,046,711 | B2 * | 8/2018 | Zimmer | B60P 3/1008 |
| 2002/0125283 | A1 * | 9/2002 | Humes | B60R 9/08<br>224/327 |
| 2003/0178382 | A1 * | 9/2003 | Tucker | A47B 96/061<br>211/85.7 |
| 2006/0131834 | A1 * | 6/2006 | Larsen | B60P 3/1066<br>280/414.1 |
| 2012/0012590 | A1 * | 1/2012 | Earp | A47B 81/005<br>220/529 |
| 2012/0168480 | A1 * | 7/2012 | Gray | B60P 3/1075<br>224/400 |
| 2014/0032447 | A1 * | 1/2014 | Fisher | B63B 32/83<br>211/85.7 |
| 2016/0296821 | A1 * | 10/2016 | Field | A47B 43/006 |
| 2018/0075679 | A1 * | 3/2018 | Niroomand | G07C 9/00944 |
| 2018/0257748 | A1 * | 9/2018 | Gugin | A63B 71/0036 |
| 2022/0355910 | A1 * | 11/2022 | Skutnik | B63B 32/83 |

* cited by examiner

KAYAK AND OTHER WATERCRAFT TYPE STORAGE SYSTEM

BACKGROUND OF THE INVENTION

Field of the Invention

The present invention relates to watercraft storage systems, such as secure, self-service storage systems and structures for watercraft.

Related Art

Typical self-propelled watercraft (e.g., a canoe; kayak; standup paddle, SUP, board) racking systems have been in use for many years and were designed to store and organize the watercraft off the ground. For watercraft rental companies, typical racking systems were designed to keep several watercraft in an organized fashion outside their place of business. Traditional watercraft racks are stationary and are suitable to store dozens of watercraft prior to renting or leasing to customers. When using these racks, the watercraft are typically secured via a chain or cable in order to lock or secure the kayaks to the rack. Once the equipment is rented, rental companies unlock the chains or cables and physically remove the watercraft from the rack and hand off (or deliver) the watercraft to their customers. The rental company then provides the customer with other required equipment, such as paddles and life jackets, which is traditionally stored in the shop. If the rental company is not located right where the customer intends to use the watercraft, the customer must port the watercraft to another location, or as is often the case, the rental company will port the watercraft to another location for the customer.

SUMMARY OF THE INVENTION

The present disclosure describes watercraft storage systems, such as a self-service watercraft storage system, using specifically designed structures which secure the watercraft (or multiple watercraft), as well as other necessary equipment, so a user, such as a customer or renter, is able to obtain the watercraft and any other necessary equipment in the very location where the user intends to use the watercraft, even though the owner of the storage system may not exist or have a place of business in that location. The secure watercraft storage system described herein is particular relevant, though not exclusively relevant, to watercraft rental companies. Thus, at least one purpose of the present invention is to increase watercraft rental locations and allow watercraft enthusiasts to more efficiently rent and safely use the watercraft, and other necessary equipment. Another purpose is to allow renters to rent and obtain the watercraft, and other necessary equipment, even in the absence of a rental company attendant. Still another purpose is to allow watercraft enthusiasts to explore even more waterways, by placing the self-service watercraft rental systems in more desired locations. And, it is another purpose of the present invention to allow renters to rent the watercraft and use the watercraft without having to first transport the watercraft to other locations.

In general, this invention can be constructed from many types of material; however, the material should preferably be resistant to the weather conditions to which the system is exposed, and hardened to prevent damage, whether unintentional or otherwise. More importantly, the invention is designed to secure various types of watercraft and other necessary equipment, such as paddles, life jackets, helmets, and the like. In the case of watercraft rental systems, customers can pay for rental equipment online and receive a code to unlock the watercraft, as well as all of the other rental equipment needed to use and enjoy the watercraft.

DETAILED DESCRIPTION OF THE INVENTION

Figure 1:
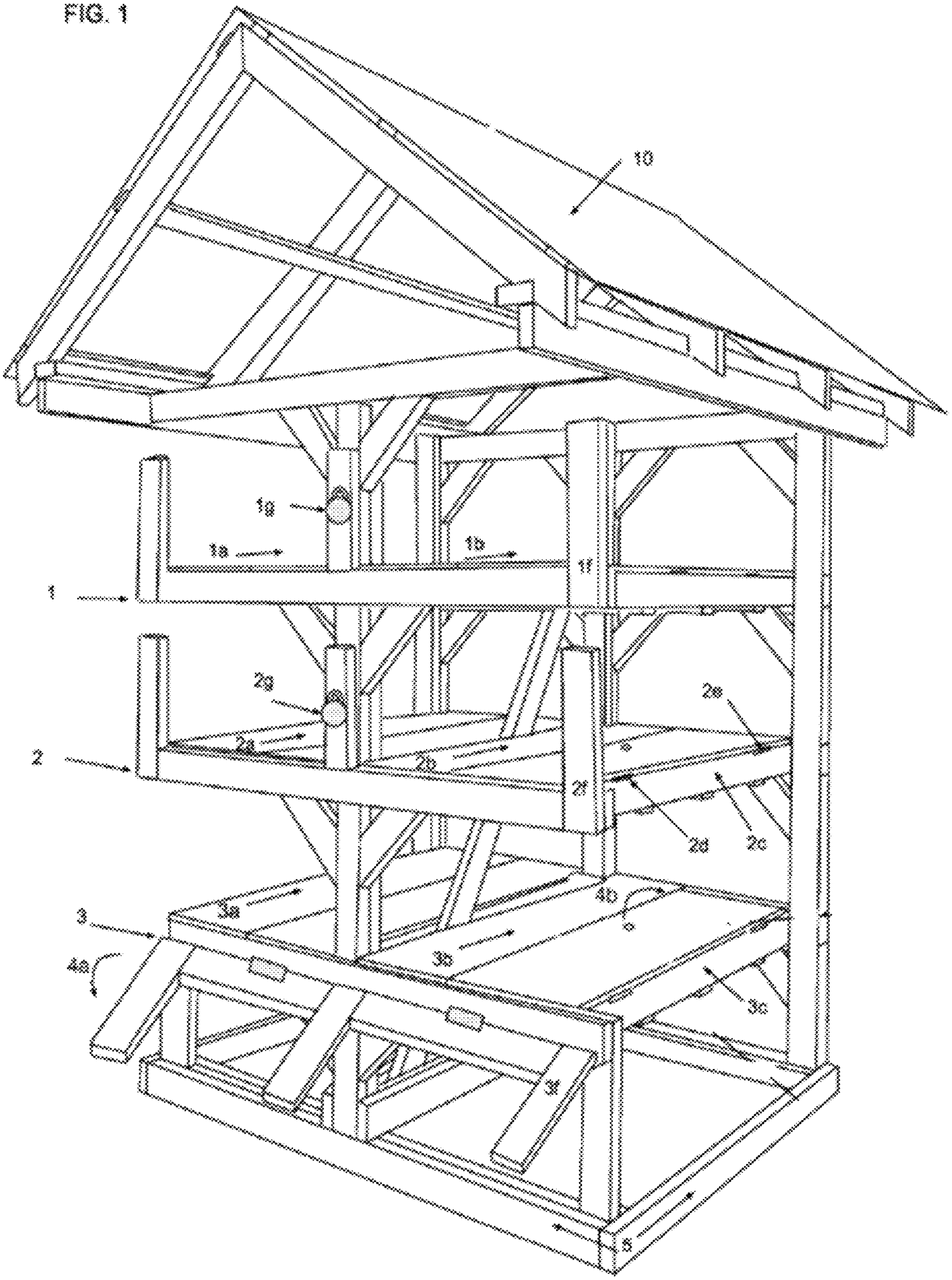
FIG. 1 illustrates a self-service watercraft system in accordance with exemplary embodiments of the invention.

FIG. 1 illustrates a self-service watercraft system (herein "the system") in accordance with exemplary embodiments of the present invention. As shown, the system comprises multiple storage locations, each one configured for securing a watercraft (e.g., a kayak) as well as other equipment that may be needed to use and enjoy the watercraft. While FIG. 1 illustrates three tiers 1, 2 and 3, with each tier comprising two storage locations, e.g., storage location 1*a* and storage location 1*b*, for securing a watercraft, it will be understood that the invention is not limited to a particular number of tiers or storage locations. For ease of discussion the following description will use the term "kayak" rather than watercraft. However, it will be readily apparent that the present invention is not limited to systems for Kayaks. Other types of watercraft such as canoes, paddleboards, and the like, can be used with a system as described herein below.

The system illustrated in FIG. 1 preferably comprises a base structure 5 and roof structure 10. It will be understood, however, that according to other embodiments, a base structure and/or roof structure may or may not be included in the system.

In certain exemplary embodiments, the system may be modular in that one or more of the components that make up the system can be removed or detached from the other system components. For example, the roof structure 10 may be removable, and each of the tiers 1, 2 and 3 may be detached from one another so that the structure can be easily transported to another location and easily reconstructed. The specific configuration for facilitating the removal of one or more components from one or more of the other components can be achieved by known means.

Each storage location, e.g., 1*a* and 1*b*, has a corresponding compartment for storing and securing other equipment that may be needed to use and enjoy the watercraft, such as life jackets, paddles, helmets, and the like. In FIG. 1, compartments 2*c* and 3*c*, associated with storage locations 2*b* and 3*b*, are clearly visible. It will be understood that each storage location preferably includes a corresponding compartment like compartments 2*c* and 3*c*. However, it is within the spirit of this invention that none of the storage locations include a corresponding compartment or some, but not all, of the storage locations include a corresponding compartment.

In a preferred embodiment, each compartment, such as compartment 3*c*, includes a hatch, or like structure, that lifts off or pivots, as illustrated for example by arrow 4*b*, open to allow a customer to access the interior of the compartment and retrieve the equipment stored therein. As stated, the equipment may include, but is not limited to, life jackets, paddles, helmets and the like. As such, the compartment must be configured, in terms of size and/or dimension, to accommodate this equipment. The hatch is configured such that it cannot be opened and, therefore, the contents of the compartment cannot be accessed while the watercraft is secured in the corresponding storage location. Thus, the hatch need not include any locking mechanism to secure the interior of the compartment, so long as the watercraft is secured in the corresponding storage location. This will become even more evident from the description below. In the embodiment illustrated in FIG. 1, the hatch associated with compartment 3*c* is rotatably secured to the frame of the system, or to an outer side of the compartment by one or more hinges, for example, hinges 2*d* and 2*e* associated with compartment 2*c*. A customer can, once the watercraft is removed from the storage location, rotate the hatch outward or inward, depending on the configuration, to open, and therefore gain access to the interior of the compartment. Each hatch may include a hand or finger sized opening or recess to facilitate opening of the hatch to the compartment. In other embodiments, the hatch may be opened in a manner other than rotating.

Figure 6:
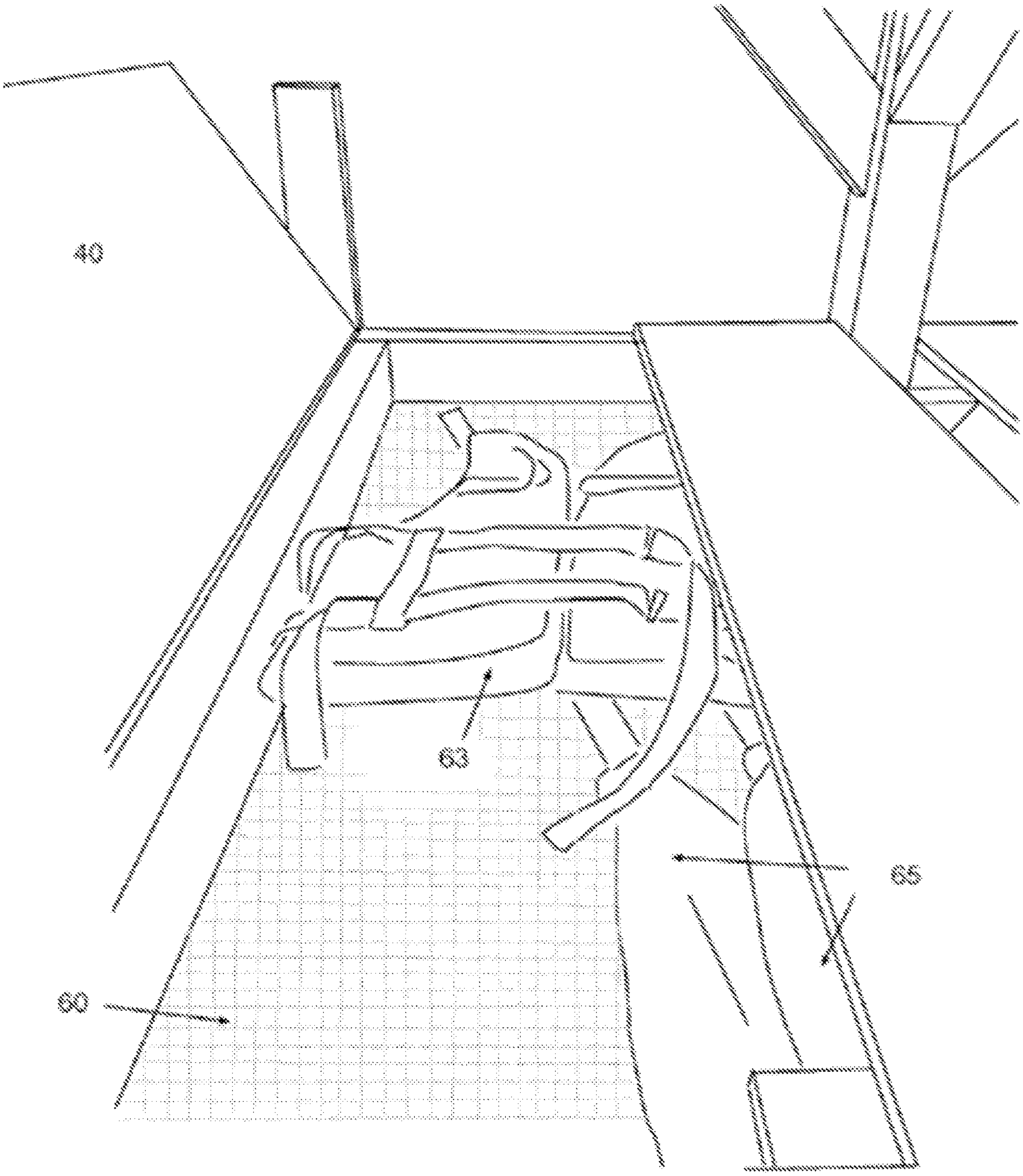
FIG. 6 is a top view of a compartment portion of a self-service watercraft system with the access hatch in an opened position in accordance with exemplary embodiments of the invention.

Each compartment may be configured such that one or more sides, including the bottom, has small openings or netting to allow for continuous ventilation of the compartment. Thus, equipment that is wet, when stowed, can more easily dry, and avoid mold and mildew. In a preferred embodiment, the bottom side (not illustrated in FIG. 1) comprises openings to allow any water to drip out of the compartment. In one exemplary embodiment, the bottom side comprises a heavy duty mesh or netting to facilitate the drainage of any water, so as to allow the equipment stored in the corresponding compartment to more easily dry. This is best illustrated in FIG. 6, which is described in more detail below. In other exemplary embodiments, the bottom may comprise the same or similar material as the rest of the system structure, except that the bottom side is configured with a plurality of small openings to facilitate the drainage of any water, so as to allow the equipment stored in the corresponding compartment to more easily dry.

Each storage location is secured by a movable arm structure. In a preferred embodiment, the moveable arm structures are rotatable, and will thus be described as such herein below. It will be understood, however, that the arm structures are movable in a manner other than being rotatable. In the embodiment illustrated in FIG. 1, the arm structures are labeled 1*f*, 2*f* and 3*f*. As illustrated, rotatable arm structures 1*f* and 2*f* are in an upright and locked position. Rotatable arm structure 3*f* is shown to be rotated to an opened and unlocked position. In this illustrated embodiment, the rotatable arm structure 3*f* rotates in a downward direction, as shown by arrow 4*a*; however, in other embodiments, the rotatable arm structure could be rotated in directions other than downward. When the rotatable arm is in the upright and locked position, a kayak in the corresponding storage location(s) are, in turn, secure and cannot be removed from the system. This is more clearly illustrated in FIG. 2. As will be described in greater detail below, the kayak is secured in the storage location by virtue of the size of one or more dimensions of the kayak relative to the size of one or more dimensions of the storage location including the rotatable arm structure. As a result, only when the rotatable arm is in the open and unlocked position, can the kayak be removed from a corresponding storage location. And, once the kayak has been removed, the customer will be able to open the hatch and access equipment stored in the corresponding compartment, as will be described in more detail below.

In the embodiment of FIG. 1, there is one rotatable arm per tier securing both (all) storage locations of that tier. Thus, for example, rotatable arm if secures both storage locations 1*a* and 1*b* when in the upright and locked position. However, it will be understood that in other exemplary embodiments, each storage location could be independently secured by a corresponding rotatable arm that operates in the same manner as the rotatable arms illustrated in FIG. 1.

Still further, each rotatable arm is locked in the upright position by a locking mechanism. In FIG. 1, locking mechanisms 1*g* and 2*g* are illustrated as locking rotatable arms 1*f* and 2*f*, respectively. In a preferred embodiment, each locking mechanism may be remotely programmable via wireless communication (e.g., using cellular and/or WIFI technology). The locking mechanisms may be unlocked by entering an active code that is provided to the customer when the customer makes a reservation. The code may be made available for a period of time so that the customer can unlock a given locking mechanism prior to and/or during the reservation period, rotate the rotatable arm structure to the opened position, and remove the kayak from the corresponding storage location and any other equipment from the corresponding compartment. After a certain period of time, for example, at the end of the reservation period, or after the customer returns and secures the kayak and other equipment, the code for unlocking the locking mechanism may expire, and it can then be reset remotely when a next customer makes a reservation.

To make a reservation, in accordance with a preferred embodiment, a customer may do so online or over the telephone, and after doing so, the customer may receive a code to unlock a corresponding storage location. The customer may receive the code online once the reservation is complete, or opt to receive the code to another device, such as a mobile phone, via email and/or text message. The customer would then enter the code into the corresponding locking mechanism at the designated reservation time to access the watercraft and other equipment.

While it is not illustrated in FIG. 1, the back side of the system structure may look the same or similar to the front side, but for, the back side may not include rotatable arm structures. See e.g., FIG. 3. Thus, the kayak may project up to or even through the back side of the system structure. However, without the rotatable arm structure, the kayak cannot be removed from the back side of the system structure.

Figure 2:
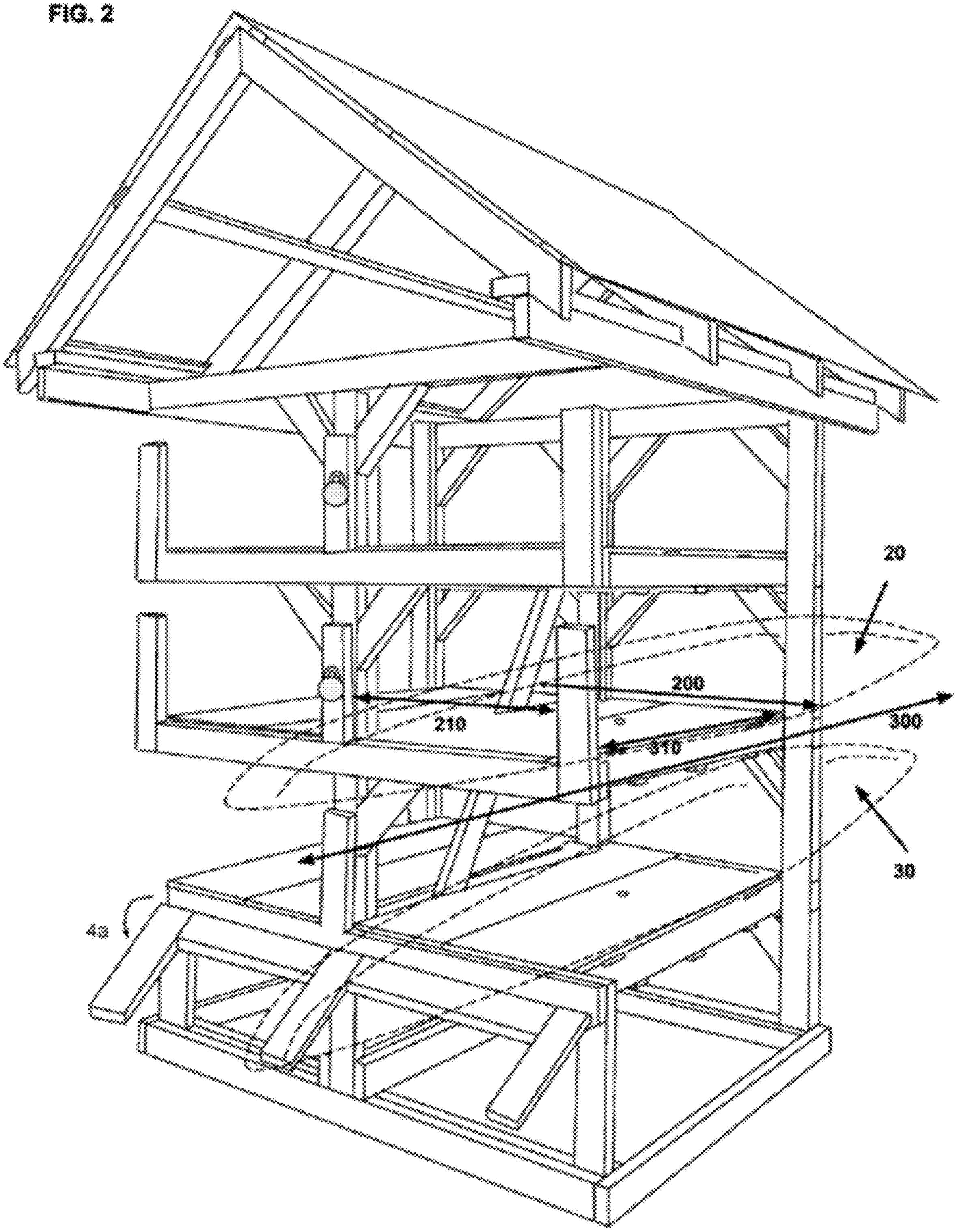
FIG. 2 illustrates securing and removing of a watercraft from the self-service watercraft system in accordance with exemplary embodiments of the present invention.

FIG. 2 illustrates securing and removing a kayak from the system in accordance with exemplary embodiments of the present invention. As shown, a kayak 20 (outlined in dashed lines) is locked and secured in a storage location on the second or middle tier of the system. It is secured by virtue of the rotatable arm structure being in the upright and locked position, as shown, and due to one or more dimensions of the kayak being relatively greater than one or more corresponding dimensions of the storage location, including the opening in the rotatable arm structure. As illustrated, the width 200 of kayak 20 is greater than (i.e., exceeds in size) the opening 210 in the rotatable arm structure, thus preventing the kayak 20 from being removed through the front side of the system structure when the rotatable arm structure is in the upright and locked position. Further, the length 300 of kayak 20 is greater than (i.e., exceeds in size) the spacing 310 between the upright structures of the rotatable arm structure and the upright structures that make up the back side of the system (i.e., the back and front sides of the storage location), preventing removal of the kayak 20 through a side opening of the storage location when the rotatable arm structure is in the upright and locked position. FIG. 2 is intended to illustrate that only when the rotatable arm structure is in the opened position, for example, as illustrated by arrow 4*a*, can kayak 20 be removed from the storage location, even though the kayak is visible and otherwise exposed to the elements, so the kayak and the equipment can more easily dry out after being used.

Figure 3:
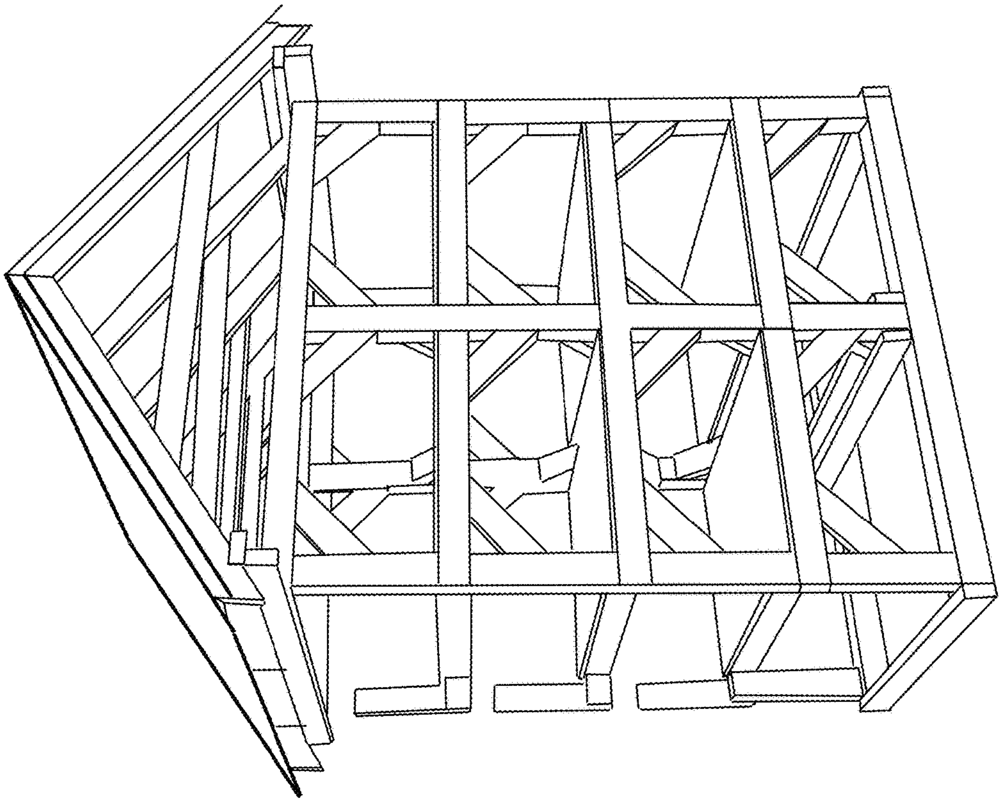
FIG. 3 is a view of the back side of a self-service watercraft system in accordance with exemplary embodiments of the invention.

FIG. 3 illustrates the back side of the system according to exemplary embodiments of the invention. As shown, and as explained above, the back side of the structure may allow a kayak (not shown) to project there through an opening in the back side of the structure. However, because there is no rotatable arm structure on the back side, the dimensions of the kayak do not permit the kayak to be removed via the back side. In alternative embodiments, the kayak may not project through any opening in the back side of the structure, and the back side of the structure may not require openings.

Figure 4:
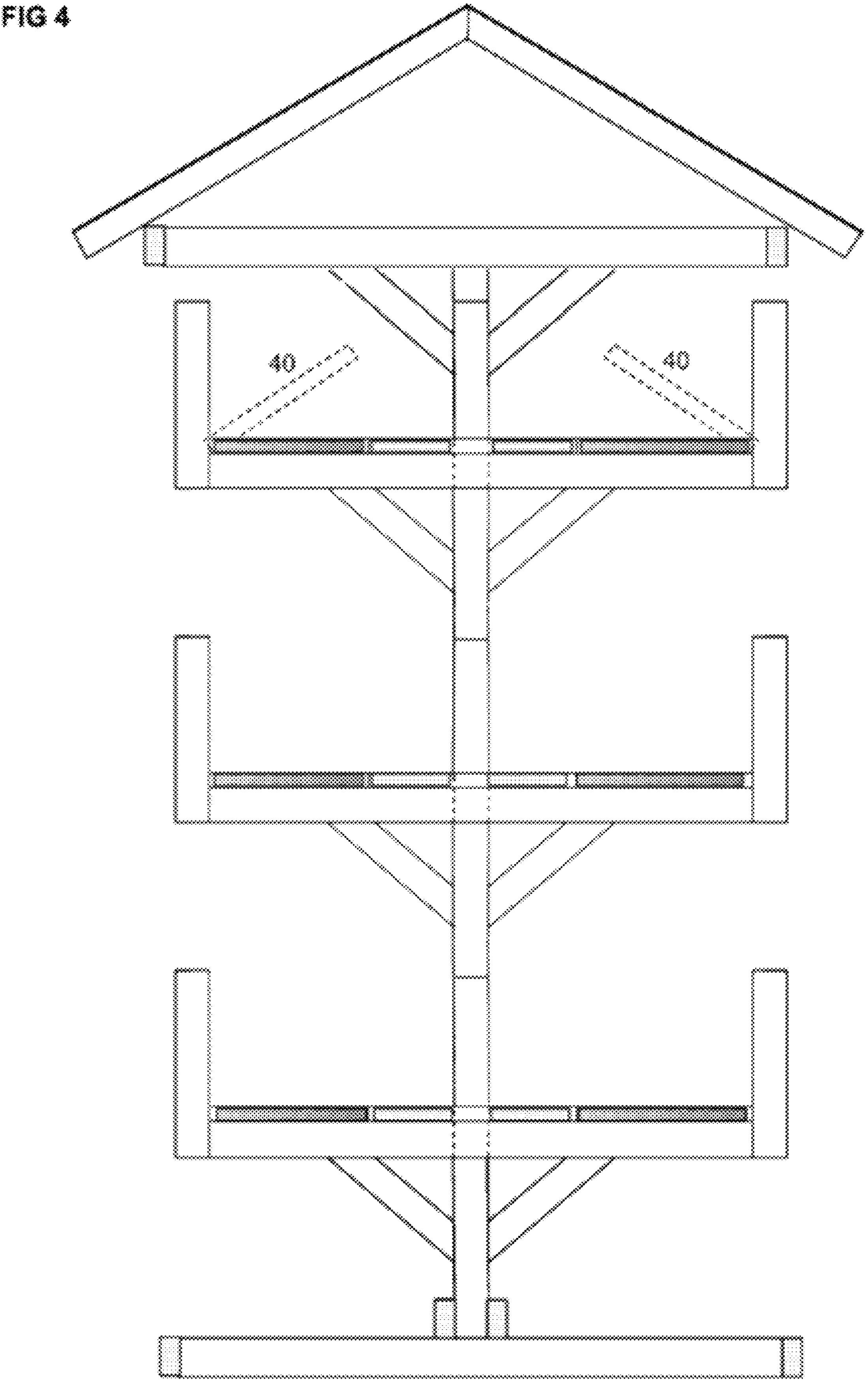
FIG. 4 is a front view of a self-service watercraft system in accordance with exemplary embodiments of the invention.

FIG. 4 illustrates a front view of the system according to exemplary embodiments of the invention. In this illustration, the front view has three tiers, with two storage locations per tier. Each tier has a corresponding rotatable arm structure. In FIG. 4, all three rotatable arm structures are shown in an upright position, as if locked. In FIG. 4, each rotatable arm structure secures both or all of the storage locations on the corresponding tier. However, as explained above, each storage location of each tier can have its own independent rotatable arm structure that secures only the kayak and other equipment stored in that storage location. FIG. 4 also illustrates how a compartment hatch 40 may, for example, swing or rotate to an opened position when a kayak is not present in the corresponding storage location.

Figure 5:
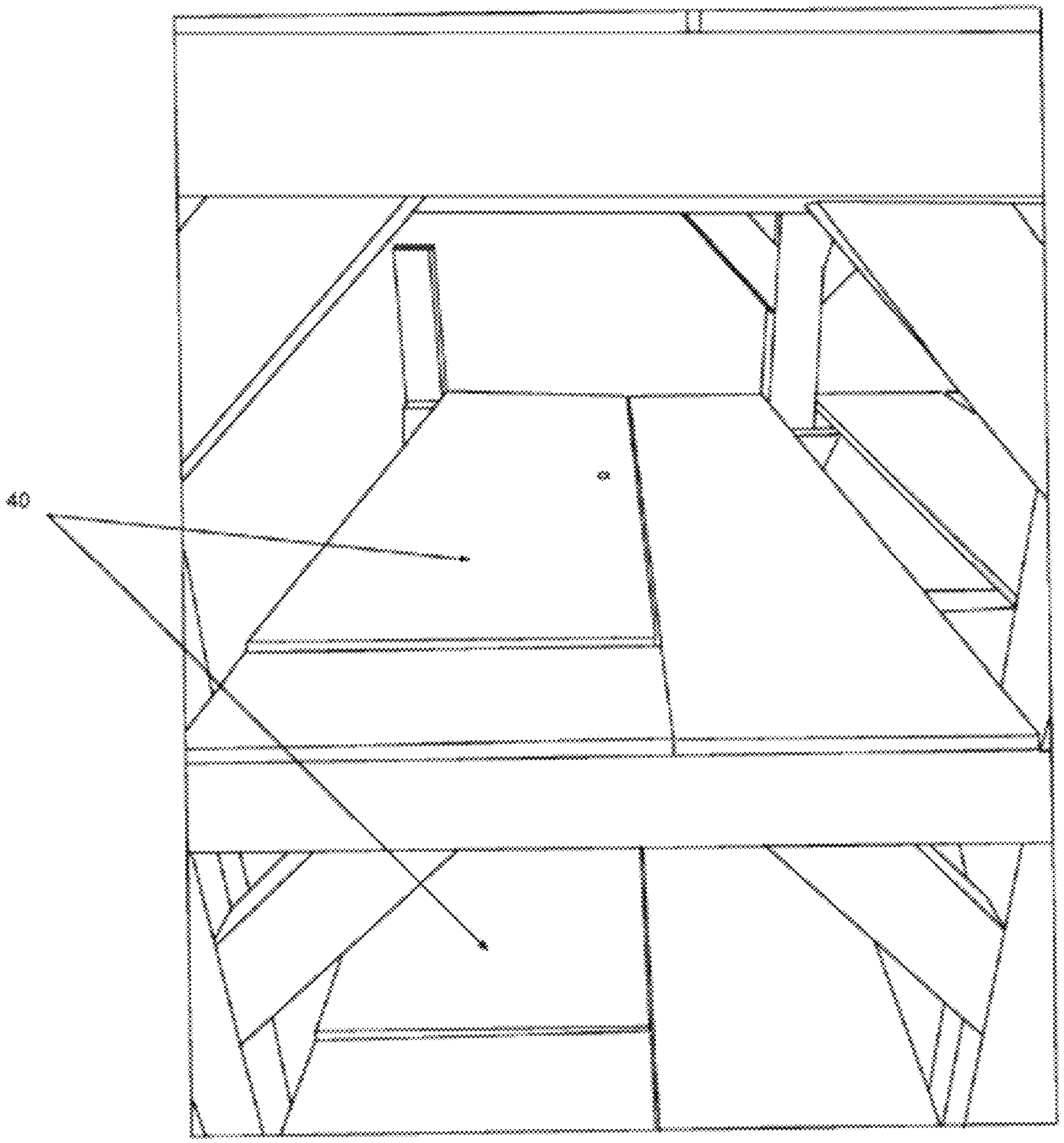
FIG. 5 is a top view of a compartment portion of a self-service watercraft system with the access hatch in a closed position in accordance with exemplary embodiments of the invention.

FIGS. 5 and 6 illustrate a top view of a compartment for storing equipment that can be used with the kayak. The compartment shown in FIG. 5 is shown with the hatch 40 in the closed position. In FIG. 6, the hatch 40 is shown in an opened position. Further, the compartment shown in FIG. 6 has a bottom comprising mesh or netting 60 which provides ventilation for the compartment. As explained above, this helps to dry any wet equipment, such as life jackets 63 and paddles 65, and prevent formation of mold and mildew.

Figure 7:
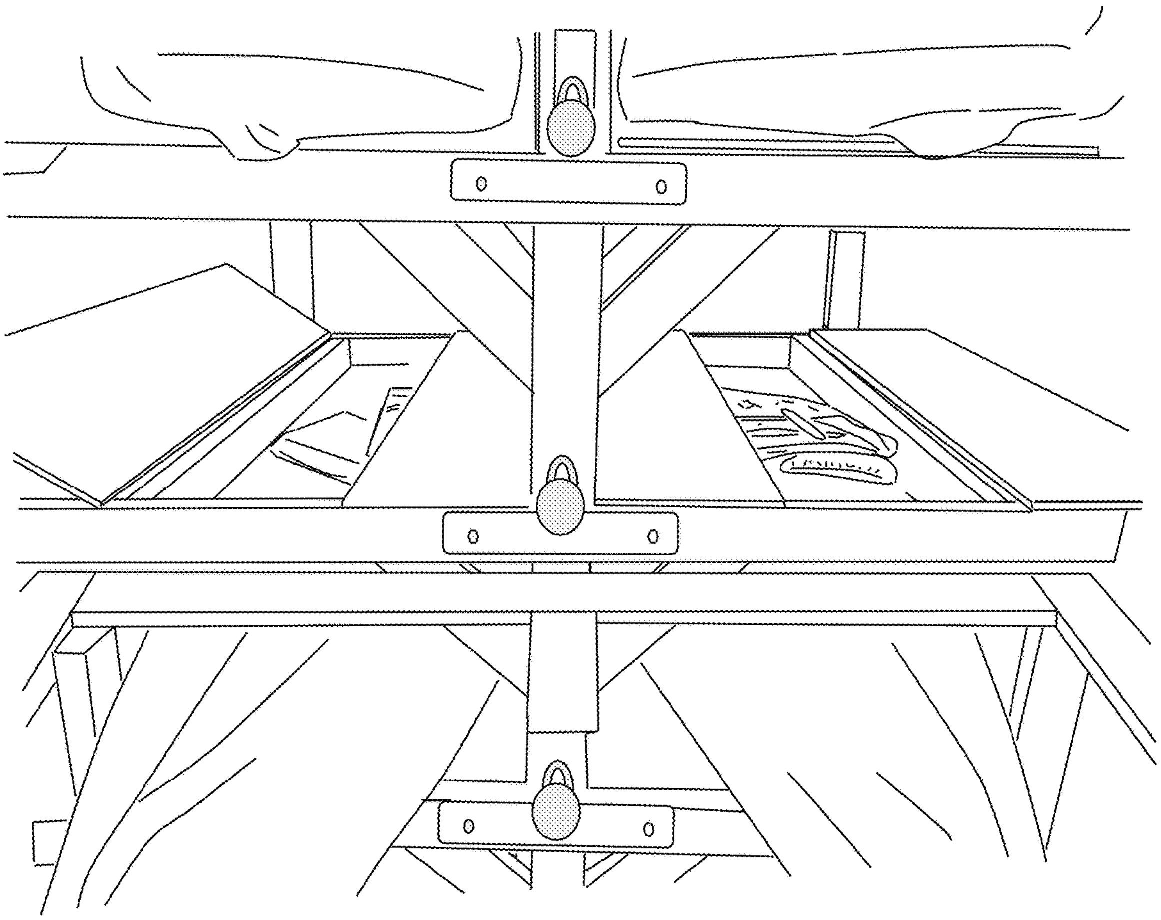
FIG. 7 is a front view of a self-service watercraft system with multiple watercraft in accordance with exemplary embodiments of the invention.

FIG. 7 illustrates a front view of the system with kayaks present in multiple storage locations. More specifically, kayaks are present in both storage locations of the upper tier and in both storage locations of the lower tier. There are no kayaks present in the storage locations of the middle tier; however, the compartments associated with the storage locations of the middle tier are visible with the hatch of each compartment rotated to an opened position.

While other embodiments than those described and illustrated herein are conceivable, those skilled in the art will appreciated that they still fall within the spirit of the invention, which is set forth in the claims that follow.

What is claimed is:

1. A system for securing watercraft comprising:

a storage location configured to receive a watercraft;

a movable arm structure positioned at one end of the storage location, the moveable arm structure configured to be selectively moved between a locked position and an opened position, wherein when the moveable arm structure is in the locked position, a dimension of the watercraft exceeding a corresponding dimension of the storage location including the moveable arm structure prevents removal of the watercraft from the storage location, and only when the moveable arm structure is in the opened position, is the watercraft removable from the storage location, wherein the dimension of the watercraft is a width of the watercraft and the corresponding dimension of the storage location including the rotatable arm structure is an opening in the rotatable arm structure.

2. The system of claim 1 further comprising:

a locking mechanism configured to lock the moveable arm structure in the locked position and, when unlocked, configured to permit the moveable arm structure to be moved to the opened position.

3. The system of claim 2, wherein the locking mechanism is remotely programmable to be unlocked by a code.

4. The system of claim 1 further comprising:

a compartment comprising an interior portion thereof, wherein access to the compartment interior is prevented by the watercraft when it is in the storage location and the moveable arm structure is in the locked position.

5. The system of claim 4, wherein the compartment comprises a hatch which is selectively in an opened or closed position, and wherein when the hatch is in the opened position, the interior of the compartment is accessible.

6. The system of claim 5, wherein the hatch is prevented from being in the opened position when the watercraft is in the storage location and the moveable arm structure is in the locked position.

7. The system of claim 4, wherein the compartment includes openings for ventilation.

8. The system of claim 1, wherein a size of a second dimension of the watercraft exceeds a size of a second, corresponding dimension of the storage location, and wherein the second dimension of the watercraft is a length of the watercraft and the second, corresponding dimension of the storage location including the moveable arm structure is the distance between a front end and a back end of the storage location.

9. A system for securing watercraft comprising:

a plurality of tiers, wherein each of the plurality of tiers has multiple storage locations, and wherein each storage location is configured to receive a watercraft;

a plurality of rotatable arm structures configured to be selectively rotated between a locked position and an opened position, wherein when a rotatable arm structure is in the locked position, a dimension of a watercraft, in a storage location, exceeding a corresponding dimension of that storage location including the rotatable arm structure prevents removal of the watercraft from that storage location, and only when the rotatable arm structure is in the opened position, is the watercraft removable from that storage location;

wherein the dimension of the watercraft is a width of the watercraft and the corresponding dimension of the storage location including the rotatable arm structure is an opening in the rotatable arm structure; and one or more compartments, each associated with a corresponding storage location, wherein access to an interior of each of the one or more compartments is prevented by the presence of a watercraft in the corresponding storage location and the rotatable arm associated with that corresponding storage location being in the locked position.

10. The system of claim 9 further comprising:

a plurality of locking mechanisms, one for each of the plurality of rotatable arm structures, configured to lock the corresponding rotatable arm structure in the locked position and, when unlocked, configured to permit the corresponding rotatable arm structure to be rotated to the opened position.

11. The system of claim 10, wherein each of the plurality of locking mechanisms is remotely programmable to be unlocked by a code.

12. The system of claim 9, wherein each of the one or more compartments comprises a hatch which is selectively in an opened or closed position, and wherein when the hatch is in the opened position, the interior of the compartment is accessible.

13. The system of claim 12, wherein each hatch is prevented from being in the opened position when a watercraft is in the corresponding storage location and the corresponding rotatable arm structure is in the locked position.

14. The system of claim 9, wherein each of the one or more compartments includes openings for ventilation.

15. The system of claim 14, wherein a bottom side of each of the one or more compartments includes a ventilated material.

16. The system of claim 9, wherein a size of a second dimension of the watercraft exceeds a size of a second, corresponding dimension of the storage location including the rotatable arm structure, and wherein the second dimension of the watercraft is a length of the watercraft and the second, corresponding dimension of the storage location including the rotatable arm structure is a distance between a front end and a back end of the storage location.

17. The system of claim 9, wherein the number of storage structures and a number of rotatable arm structures is the same, such that each of the multiple storage locations has its own corresponding rotatable arm structure.

18. The system of claim 9, wherein the watercraft is a kayak.

* * * * *